Figure 1:
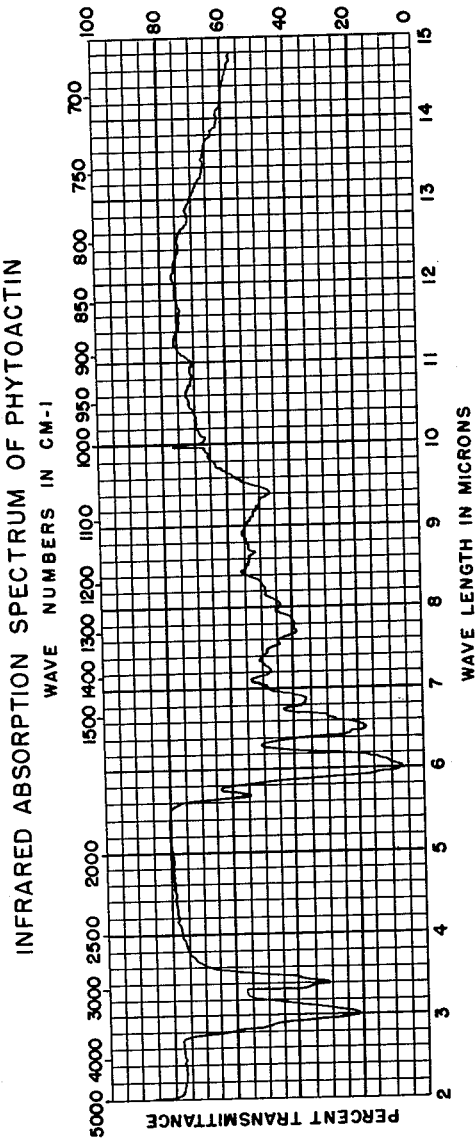

May 1, 1962  J. ZIFFER ETAL  3,032,471
POLYAMIDOHYGROSTREPTIN AND PRODUCTION THEREOF
Filed Feb. 5, 1960  3 Sheets-Sheet 1

INVENTORS:
JACK ZIFFER
SACHIKO J. ISHIHARA
THOMAS J. CAIRNEY
ALFRED W. CHOW
BY
ATT'YS

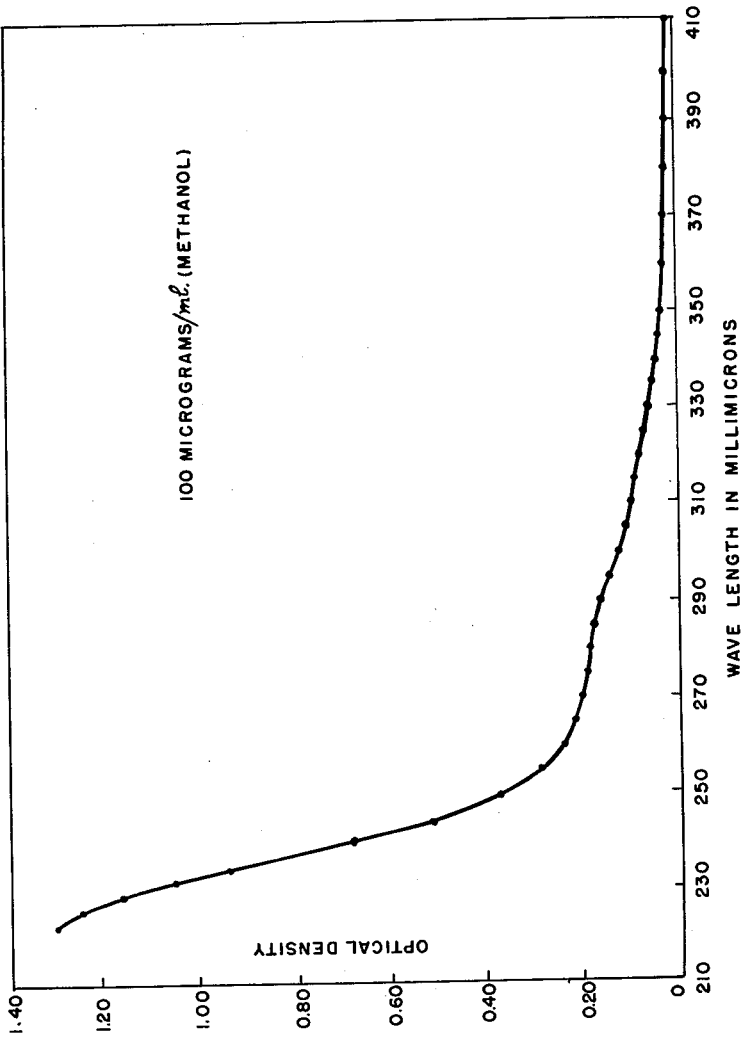

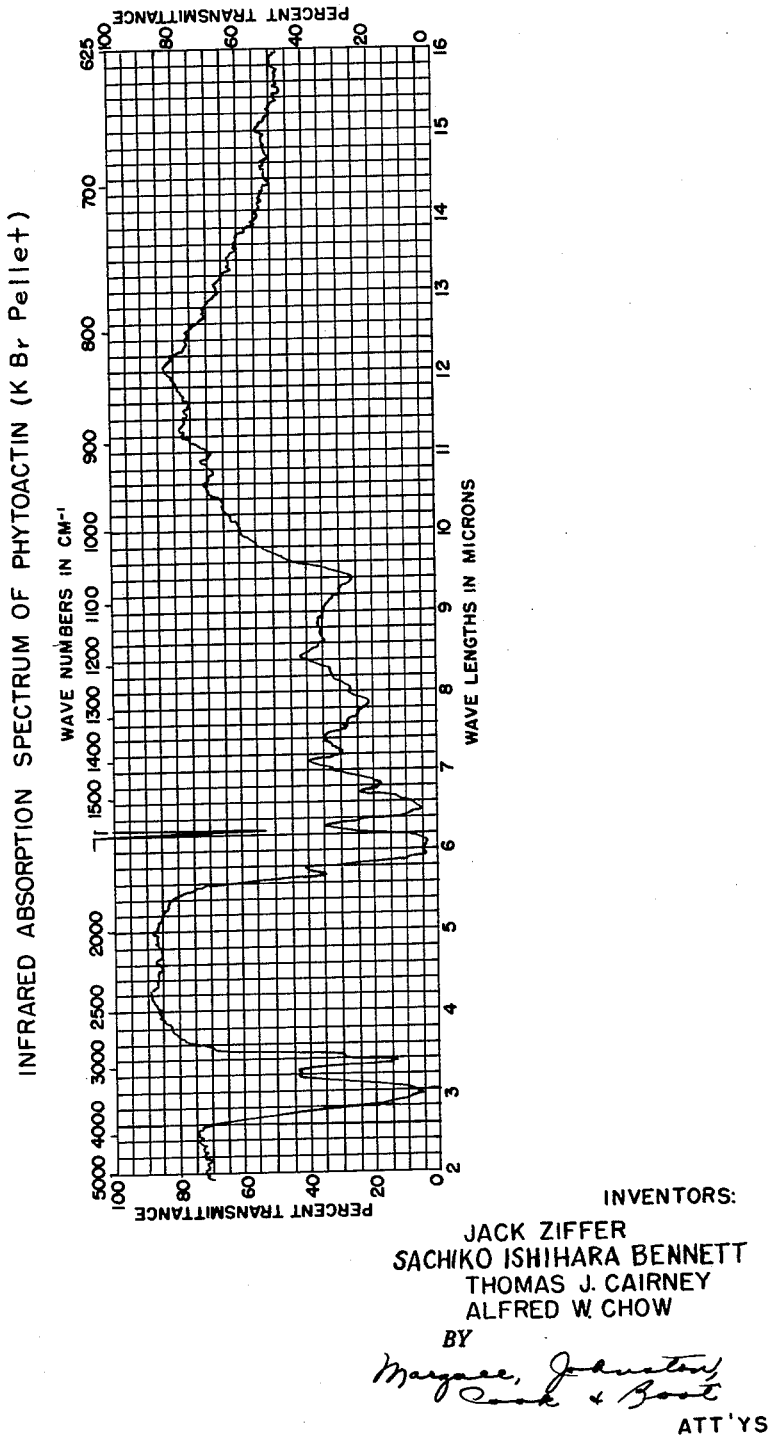

United States Patent Office 3,032,471
Patented May 1, 1962

3,032,471
POLYAMIDOHYGROSTREPTIN AND PRODUCTION THEREOF
Jack Ziffer, Sachiko Ishihara Bennett, and Thomas J. Cairney, Milwaukee, Wis., and Alfred W. Chow, Philadelphia, Pa., assignors to Pabst Brewing Company, Chicago, Ill., a corporation of Delaware
Filed Feb. 5, 1960, Ser. No. 7,064
8 Claims. (Cl. 167—65)

This invention relates to an antifungal substance and to a process for producing it.

The invention is concerned more particularly with a new antifungal identified by the arbitrary name Phytoactin, now known by the non-proprietary name of "polyamidohygrostreptin," to its production by fermentation, to methods for its recovery from fermentation broths and to the process for its purification. The invention includes within its scope the antifungal in dilute forms, as crude concentrates and purified preparations.

Phytoactin is especially effective against many fungi pathogenic to plants and the principal object of the present invention is to provide a new and useful antibiotic for the control of diseases caused by these phytopathogenic fungi.

The new antifungal is formed during cultivation under controlled conditions of a member of the family Streptomycetaceae, specifically, a strain of the species *Streptomyces hygroscopicus*. A culture of a microorganism strain which produces Phytoactin was originally isolated from domestic soil and has been deposited in the culture collection of the United States Department of Agriculture, Agricultural Research Service, Northern Utilization Research and Development Division, Peoria, Illinois, and the culture has been assigned the number NRRL 2752 in the culture collection. Accordingly, the strain producing Phytoactin is referred to herein as *Streptomyces hygroscopicus* NRRL 2752, or for brevity, NRRL 2752.

Strain NRRL 2752 has been comparatively tested for the production of Phytoactin with other reported strains of *S. hygroscopicus* and with microorganisms which were originally identified in some other manner but appeared to be correctly identified as strains of *S. hygroscopicus*. The tests demonstrated that none of the other strains produces Phytoactin.

Microorganism strains which were tested and found not to produce phytoactin include: *S. hygroscopicus* var. *angustmyceticus* (Yuntsen et al., J. Antibiotics (Japan), 7A, 113, 116 (1954); 9A, 195 (1956); 11A, 233, 244 (1958); reported to produce angustmycins A, B, C); *S. hygroscopicus* NRRL B–1346 (ATCC 10976). *S. hygroscopicus* NRRL B–1503 (Nakazawa et al., J. Agr. Chem. Soc., Japan, 28, 296, 715 (1954), C.A. 50, 5839 (1956); Japanese Patent No. 8,046 (1954); C.A. 50, 8146 (1956); reported to produce hygroscopins); *S. rutgersensis* var. *castelarense* NRRL B–1567 (Cercos, Rev. Argentina Agron., 20, 53 (1953), C.A. 48, 2819 (1954); Waksman et al., Actinomycetes and Their Antibiotics (1953), page 197; reported to produce camphomycin); *S. endus* NRRL 2339 (Gottlieb, Phytopath., 41, 393 (1951); U.S. Patent No. 2,746,902); reported to produce endomycin); and *S. platensis* NRRL 2364 (reported to produce oxytetracycline).

It originally appeared on the basis of the classification system in Waksman and Lechevalier, Actinomycetes and Their Antibiotics (Williams and Wilkens Co., 1953, pages 9–20), that strain NRRL 2752 belonged to the *Streptomyces albus* group of microorganisms, although from its growth and biochemical characteristics it did not appear to be identical with any of the described species. Also, the properties of the antibiotics reportedly produced by these and other cultures are distinct from those of the new antifungal of the present invention, Phytoactin. Subsequently, investigations were undertaken based on the classification system published in Applied Microbiology, 6, 52–79 (1958), by Pridham, and direct morphological comparison with known strains of *S. hygroscopicus*, paying particular attention to the three common characteristics reported for *S. hygroscopicus* (Tresner et al., Applied Microbiology, 4, 243–250 (1956)): (*a*) compact spiral sport-bearing hyphae, (*b*) grey-colored aerial mycelium on certain media, and (*c*) dark areas on certain media which may be hygroscopic. These investigations established that strain NRRL 2752 is a strain of *S. hygroscopicus*.

In view of the original classification as apparently a member of the *S. albus* group, strain NRRL 2752 also has been comparatively tested for the production of Phytoactin with the available species of the *S. albus* group which appear to be the most closely related thereto, namely, *S. californicus* ATCC 3312 and *S. gelaticus* ATCC 3323. The tests demonstrated that neither of the latter strains produces Phytoactin.

The characteristics of the strain NRRL 2752 closely resemble those described in our copending application Serial No. 659,818, filed May 17, 1957, and our continuation application thereof, Serial No. 6,979, filed February 5, 1960, for the phytostreptin-producing strain of *S. hygroscopicus*, NRRL 2751. This strain also was originally isolated from domestic soil, and a culture thereof is on deposit in the aforementioned culture collection. There are, however, certain morphological and biochemical characteristics that distinguish the two strains, as described hereinafter.

The organism NRRL 2752 produces spiral sporophores and the slightly oval to spherical spores measure 1–1.5 microns in diameter. The following growth characteristics are observed after incubation (28° C.) on various media for 14 days.

Nutrient agar: Moderate growth; colorless to white aerial mycelium; very faint brown soluble pigment Glucose asparagine agar: Moderate growth; very light grey aerial mycelium; very faint brown soluble pigment Starch agar: Abundant growth; grey aerial mycelium; very faint brown soluble pigment Emerson's broth: Colorless ring of growth; submerged growth on bottom Dextrose nitrate broth: Colorless ring of growth; submerged growth on bottom; strong nitrate reduction Litmus milk: Orange ring of growth; white aerial mycelium; no peptonization or coagulation in 14 days, peptonization starting slowly after 21 days Gelatin: Colorless to white ring of growth; submerged growth on bottom; gelatin liquefied Potato: Moderate growth; brownish vegetative growth on surface with light grey aerial mycelium on drying potato edge; light grey-brown diffused pigment Oatmeal agar: Abundant growth; grey aerial mycelium; light brown soluble pigment Yeast extract-oatmeal agar: Abundant growth; grey aerial mycelium; light brown soluble pigment Potato dextrose agar: Abundant growth; grey aerial mycelium; light brown soluble pigment Wickerham's agar: Moderate growth; white to very light grey aerial mycelium; light brown soluble pigment Sabouraud's agar: Moderate growth; colorless to very light grey aerial mycelium; very faint brown soluble pigment Czapek agar: Moderate growth; white to very light grey aerial mycelium; very faint brown soluble pigment Temperature: Excellent growth 28°–34° C. Poor growth on agar but good growth on potato plug at 41° C. No growth at 50° C.

The growth characteristics of the organism NRRL 2752 were also observed following incubation on the diagnostic media described below for 23 days at 28° C., and any modifications in growth characteristics which occurred after 23 days and up to 44 days at 28° C., were noted. The media were as follows.

Asparagine-glucose-meat extract agar: Percent
  Glucose _____ 1
  Asparagine _____ 0.05
  $K_2HPO_4$ _____ 0.05
  Beef extract _____ 0.2
  Agar _____ 1.5
  Tap water.
  pH adjusted to 7 before sterilization.

Bennett's agar:
  Glucose _____ 1
  Beef extract _____ 0.4
  N-Z-Amine A _____ 0.4
  Yeast extract _____ 0.1
  NaCl _____ 0.25
  Agar _____ 1.5
  Distilled water.

Corn steep liquor agar (Waksman):
  Glucose _____ 1
  Peptone _____ 0.5
  Corn steep liquor _____ 1.5
  NaCl _____ 0.5
  Agar _____ 1.5
  Distilled water.
  pH adjusted to 7 before sterilization.

Czapek agar (Difco):
  Sucrose _____ 3
  $NaNO_3$ _____ 0.2
  $K_2HPO_4$ _____ 0.1
  $MgSO_4.7H_2O$ _____ 0.05
  KCl _____ 0.05
  $FeSO_4.7H_2O$ _____ 0.001
  Agar _____ 1.5
  Distilled water.

Gelatin (Waksman):
  Glucose _____ 2
  Peptone _____ 0.5
  Gelatin _____ 15.0
  Tap water.
  pH adjusted to 7.2 before sterliziation.

Litmus milk:
  Glucose _____ 1
  Dried skim milk _____ 9.0
  Yeast extract _____ 0.2
  Protease peptone _____ 0.2
  Distilled water.
  1% litmus solution to color.

Nitrate broth (Difco):
  Beef extract _____ 0.3
  Peptone _____ 0.5
  $KNO_3$ _____ 0.1
  Distilled water.

Oatmeal-yeast extract agar:
  Glucose _____ 0.5
  Yeast extract _____ 0.1
  Oatmeal extract _____ 5.0
  Agar _____ 1.5
  Tap water.

Potato dextrose agar:
  Glucose _____ 2
  Potato extract _____ 20
  Agar _____ 2
  Tap water.

Potato plug: Raw potato plug moistened with distilled water.

Starch agar (Difco): Percent
  Beef extract _____ 0.3
  Soluble starch _____ 1
  Agar _____ 1.2
  Distilled water.

Yeat extract agar (Waksman):
  Glucose _____ 1
  Yeast extract _____ 1
  Agar _____ 1.5
  Tap water.
  pH adjusted to 6.8 before sterilization.

The following growth characteristics were observed, the aerial mycelium colors being described according to Ridgeway, Color Standards and Color Nomenclature (Washington, D.C., 1912).

Asparagine-glucose-meat extract agar: Excellent growth with pallid neutral to pale neutral grey aerial mycelium. Black areas forming after 14 days, becoming moist after 30 days. Light yellow brown reverse and light brown soluble pigment.

Bennett's agar: Excellent growth with colorless moist vegetative mycelium. Light yellow-brown reverse and light brown soluble pigment.

Corn steep liquor agar (Waksman): Moderate growth with colorless moist vegetative mycelium. Light yellow-brown reverse with fairly strong brown soluble pigment.

Czapek agar (Difco): Excellent growth with pallid to neutral grey aerial mycelium. Black areas forming after 23 days, not becoming moist after 44 days. Light yellow reverse and light brown soluble pigment.

Gelatin (Waksman): Not liquefied after 9 days; liquefied after 16 days.

Litmus milk: White ring of growth with slight coagulation. 25% peptonization after 7 days, 60% after 14 days, 70% after 23 days, 90% after 30 days and 100% after 44 days. Milk pH 6.55 after 23 days.

Nitrate broth (Difco): Reduced.

Oatmeal-yeast extract agar: Moderate growth with pallid mouse to light mouse grey aerial mycelium. Black areas forming after 23 days becoming moist after 30 days.

Potato dextrose agar: Excellent growth with pallid neutral to light neutral grey aerial mycelium. Black areas forming after 30 days, not becoming moist after 44 days. Yellow reverse and light brown soluble pigment.

Potato plug: Poor growth with brownish vegetative mycelium. White to light grey on drying tip.

Starch agar (Difco): Moderate growth with pallid mouse grey aerial mycelium. Black areas forming after 14 days, becoming moist after 23 days. Light yellow-brown reverse and light brown soluble pigment.

Yeast extract agar (Waksman): Excellent growth with colorless vegetative mycelium and few white areas. Light yellow-brown reverse and light brown soluble pigment.

The above results included the dark areas characteristic of *S. hygroscopicus*, which were exhibited on asparagine-glucose-meat extract agar, Czapek agar, oatmeal-yeast extract agar, potato dextrose agar, and starch agar. The organism also produced the characteristic grey-colored aerial mycelium on a number of the media, and the characteristic compact spore-bearing hyphae were produced on agar media such as asparagine-glucose-meat extract agar, potato dextrose agar, and oatmeal-yeast extract agar.

The growth characteristics of the Phytoactin-producing organism NRRL 2752 closely resemble those for the phytostreptin-producing organism NRRL 2751, described in the aforementioned copending applications. The two cultures were closely examined over a 41 day incubation period (28° C.) on various media. Identical growth characteristics were obtained an oatmeal agar, potato dextrose agar, calcium malate agar, potato plug, dextrose nitrate broth and gelatin. On the other media, NRRL 2752, in general, formed darker aerial mycelium than did NRRL 2751. In addition, there was a marked difference in the rate of peptonization of milk by the two cultures. A comparison of the two cultures is given in Table I.

TABLE I

| Media | NRRL 2751 | NRRL 2752 |
|---|---|---|
| Asparagine glucose agar. | Excellent growth; dark grey aerial mycelium with a few light grey spots. | Excellent growth; light and dark grey aerial mycelium with a few black areas. |
| Starch agar | Excellent growth; dark grey aerial mycelium. | Excellent growth; dark grey to black aerial mycelium with small white areas. |
| Nutrient broth | Almost all growth fallen to bottom after 24 days. | Complete formed pellicle; white to very light grey aerial mycelium. |
| Litmus milk | Rapid peptonization, complete in 1 to 2 weeks. | Very slow peptonization, complete after 6 weeks. |
| Oatmeal-yeast extract agar. | Excellent growth; medium grey aerial mycelium. | Excellent growth; medium grey to black aerial mycelium. |
| Wickerham agar | Excellent growth; white aerial mycelium; few black spots on agar butt area. | Excellent growth; white to light grey to black aerial mycelium; black growth covers ½ of agar butt area. |
| Nutrient agar | Good growth; colorless to white smooth growth covering entire agar area. | Good growth; small amount of white to grey aerial mycelium in agar butt area; remainder of growth (beaded) colorless. |

Phytoactin is particularly effective against fungi. It also has antibacterial properties. Its in vitro spectrum against a number of fungi and bacteria is shown in Table II and IIA. These tests were run in slant tubes using agar media containing various concentrations of the antibiotic in the range of 0.01 to 197 micrograms per ml. Potato dextrose agar was used for all of the fungal cultures. Penassay seed agar was used for *Candida albicans* and the bacterial cultures. Sabouraud maltose agar was used for the dermatophytes *Epidermophyton floccosum*, *Microsporum gypseum*, and *Trichophyton mentagrophytes*. The agar media were inoculated with the respective test organism and incubated at 28° C., until the control tube, containing no antibiotic, showed good growth (approximately 2–4 days for the fungal cultures and 1 day for *C. alibcans* and the bacterial cultures). The inhibiting concentration of Phytoactin for each of these organisms was then noted. The incubation period was then continued for four days and two additional inhibition readings made; at two days and four days respectively (after the initial reading). One culture, *Endoconidiophora fagacearum* (*Ceratocystis fagacearum*), the causative agent of oak wilt, was incubated for an additional four week period with no change in the inhibitory level of Phytoactin (0.3 μg. per ml.). Attempts to isolate *E. fagacearum* (*C. fagacearum*) from the inhibited levels were unsuccessful. Another culture, *Ceratostomella ulmi* (*Ceratocystis ulmi*), the causative agent of Dutch elm disease, was also incubated for an additional four week period with no change in the inhibiting level of Phytoactin (0.8 μg. per ml.). Attempts to isolate *C. ulmi* from the inhibited levels were unsuccessful. Accordingly, as indicated by the invitro data, Phytoactin, in general, is an effective antifungal and gram-positive antibacterial substance.

TABLE II

*In Vitro Antimicrobial Spectrum*

| Culture | Culture inhibited at indicated concentration (μg./ml.) | | |
|---|---|---|---|
| | After initial growth [1] | 2 days later | 4 days later |
| Alternaria dianthi | 0.8 | 2.4 | 7.3 |
| Alternaria solani | 0.8 | 0.8 | 0.8 |
| Botrytis gladiolorum | 2.4 | 2.4 | 2.4 |
| Botrytis cinerea | 0.8 | 2.4 | 2.4 |
| Ceratostomella ulmi | 0.8 | 0.8 | 0.8 |
| Colletotrichum circinans | 0.8 | 0.8 | 0.8 |
| Diplodia (zeae) | 0.8 | 2.4 | 7.3 |
| Endoconidiophora fagacearum (Ceratocystis fagaceraum) | 0.3 | 0.3 | 0.3 |
| Endoconidiophora fimbriata (Ceratocystis fimbriata) | 0.8 | 0.8 | 0.8 |
| Endothia parasitica | 0.8 | 0.8 | 2.4 |
| Fusarium oxy f. dianthi 5A | 2.4 | [2] 2.4–197 | [2] 2.4–197 |
| Fusarium oxy f. gladioli | 0.8 | 7.3 | [2] 2.4–197 |
| Fusarium roseum | 2.4 | 7.3 | 7.3 |
| Gibberella zeae | 7.3 | [2] 22–197 | [3] >197 |
| Glomerella cingulata | 0.3 | 0.8 | 0.8 |
| Helminthosporium sativum | 0.8 | 0.8 | 0.8 |
| Helminthosporium victoria | 0.8 | 0.8 | 0.8 |
| Macrophominia phaseoli | 2.4 | 2.4 | 2.4 |
| Phytophthora cinnamomi | 7.3 | [2] 22–197 | [2] 22–197 |
| Pythium sp. No. 389 | 2.4 | 22 | 22 |
| Sclerotina fructicola | 0.8 | 0.8 | 0.8 |
| Ustilago sphaerogena | 2.4 | 2.4 | 2.4 |
| Verticillium albo-atrum | 0.8 | 2.4 | 2.4 |
| Candida albicans | 2.4 | 2.4 | 2.4 |
| Bacillus cereus | 7.3 | 22 | 22 |
| Bacillus cereus var. mycoides | 7.3 | 22 | 22 |
| Bacillus megatherium | 7.3 | 7.3 | 7.3 |
| Bacillus subtilis | 22 | 22 | 22 |
| Escherichia coli | [3] >197 | >197 | >197 |
| Micrococcus flavus | 2.4 | 2.4 | 2.4 |
| Micrococcus pyogenes var. aureus | 7.3 | 22 | 22 |
| Mycobacterium tuberculosis No. 607 | [3] >197 | >197 | >197 |
| Sarcina lutea | 7.3 | 22 | 22 |

[1] Inhibition reading made when control tube shows good growth—usually 2–4 days.
[2] Partial inhibition of culture.
[3] No inhibition at this level.

Additional results are shown in Table IIA.

TABLE IIA

*In Vitro Antimicrobial Spectrum*

| Culture | Culture inhibited at indicated concentration (μg./ml.) | | |
|---|---|---|---|
| | After initial growth [1] | 2 days later | 4 days later |
| Rhizoctonia solani | 2.4 | 2.4 | 2.4 |
| Epidermophyton floccosum | 0.8 | 0.8 | 2.4 |
| Microsporum gypseum | 2.4 | 2.4 | 2.4 |
| Trichophyton mentagrophytes | 0.8 | 0.8 | 0.8 |

[1] Inhibition reading made when control tube shows good growth—usually 2–4 days.

Phytoactin has been shown in greenhouse studies to be an effective fungicide for the control of plant diseases such as tomato early blight, tomato late blight, bean rust and wheat leaf rust. These diseases are caused respectively by *Alternaria solani* (Ell. & Mort.) Jones & Grout, *Phytophthora infestans* (Mont.) de Bary, *Uromyces*

*phaseoli* (Pers.) Wint., and *Puccinia rubigo-vera* (DC.) Wint. Bonny Best tomato plants, pinto bean plants and wheat plants were used for the respective tests.

Phytoactin was prepared for the spraying operation by dissolving it in methanol with and without the use of a wetting agent and diluting with water, which apparently produced a homogeneous colloidal solution of the antifungal. The final alcohol concentration was less than 6%. The potted plants were sprayed on a turntable by means of a spray gun, under standard conditions, with various dilutions. After the plants had dried, they were inoculated with spores of the above organisms produced under standard conditions. The inoculated plants were then placed in humidity chambers for 24 hours and then returned to the greenhouse. After several days, necrotic spots appeared on the leaves, and these were counted and expressed as a percentage of the control plants. The resulting dosage-response curves were plotted on logarithmic probability paper and the concentration of antifungal necessary to give 95% control of the respective disease ($ED_{95}$) determined. The data for these greenhouse tests are given in Tables III, IV, and V. As indicated by these data, Phytoactin gives effective disease control at low concentration levels and is relatively non-phytotoxic.

TABLE III

*Greenhouse Disease Control Studies*

| Wetting agent | $ED_{95}$ (p.p.m.) | | |
|---|---|---|---|
| | Tomato early blight [1] | Tomato late blight [1] | Bean rust [1] |
| None | 52, 80 | 98, 110 | 30, 15 |

| Concentration, p.p.m. | Phytotoxicity | |
|---|---|---|
| | Bony Best tomatoes | Pinto beans |
| 3.2 | None | None. |
| 10 | do | Do. |
| 32 | do | Do. |
| 100 | do | Do. |

[1] Replicate tests.

TABLE IV

*Greenhouse Disease Control Studies*

| Wetting agent | $ED_{95}$ (p.p.m.) | | |
|---|---|---|---|
| | Tomato early blight [1] | Bean rust [1] | Wheat leaf rust |
| None | 60, 22 | 4. 5, 20, 10 | 1 |
| 0.2% Tween 20 [2] | 90, 38 | 0. 2, 10, 6 | 0. 4 |

| Wetting agent | Concentration p.p.m. | Phytotoxicity | |
|---|---|---|---|
| | | Bony best tomatoes [1] | Pinto beans |
| None | 0.2 | None, very slight | None. |
| | 2.0 | do | Do. |
| | 20.0 | None, slight | Do. |
| 0.2% Tween 20 | 0.2 | None | Do. |
| | 2.0 | do | Do. |
| | 20.0 | do | Do. |

[1] Replicate tests.
[2] Polyoxyethylene sorbitan monolaurate.

TABLE V

*Greenhouse Disease Control Studies*

| Wetting agent | Concentration, p.p.m. | Percent disease control, tomato early blight |
|---|---|---|
| None | 2 | 39. 5 |
| | 5 | 65 |
| | 10 | 76. 7 |
| | 25 | 90. 9 |
| | 50 | 94. 6 |
| | 100 | 97. 2 |
| 0.1% Tween 85 [1] | 2 | 86. 3 |
| | 5 | 86 |
| | 10 | 89 |
| | 25 | 94. 2 |
| | 50 | 93. 8 |
| | 100 | 96. 4 |

[1] Polyoxyethylene sorbitan trioleate.

Phytoactin is a polypeptide having no terminal free amino group as indicated below by its chemical and physical properties. It is a very light tan solid and is soluble in methanol, ethanol, n-butanol, chloroform, acetone, methylisobutyl ketone, dioxane, tetrahydrofuran, formamide, ethylene chloride and 1 N NaOH. It is insoluble in petroleum ether (30–60° C.), benzene, and ethyl acetate, and slightly soluble in diethyl ether, 1 N HCl, and water.

Phytoactin gives a positive permanganate test, and negative anthrone, ferric chloride, Molisch and ninhydrin tests. It gives no color with cold concentrated sulfuric acid. It is precipitated from aqueous methanol solutions by ammonium sulfate, calcium chloride, cupric chloride, lead acetate, mercuric chloride, sodium chloride, zinc chloride, picric acid, salicylic acid, phosphotungstic acid, trichloroacetic acid, methyl orange and Reinecke salt.

Phytoactin also gives a positive biuret test, and negative Millon, Liebermann Buchard, Maltol, Pauly, Ehrlich (dimethylaminobenzaldehyde), and Sakaguchi tests.

The polypeptide nature of this antibiotic was revealed by hydrolysis with 6 N HCl. The hydrolysate, now ninhydrin positive, was analyzed using two dimensional paper chromatographic techniques. The presence of at least eight ninhydrin-positive components was detected, of which the amino acids valine, alpha-alanine, proline, leucine (or isoleucine), arginine, glycine and serine were identified.

Phytoactin (methanol solution) is heat stable, unchanged after heating for 7 days at 40° C. or for 3 hours at 65° C. It is dialyzable through a cellophane membrane (30% aqueous methanol). It is not digested by pepsin, trypsin, Pabst purified *Bacillus subtilis* bacterial protease or Pabst purified *Aspergillus oryzae* fungal protease. Phytoactin exhibits strong end absorption in the lower regions of the ultra-violet with no significant maxima in the region 230–410 m$\mu$. Determinations were made in methanol (100 $\mu$g/ml.) with a Beckman DU spectrophotometer, and the ultra-violet absorption spectrum is shown in FIGURE 2 of the accompanying drawings.

Phytoactin shows a number of characteristic absorption bands in the infrared region when dissolved in chloroform, the more significant of which are at the following frequencies (expressed in microns): 2.92, 3.04, 3.38, 3.43, 3.48, 5.72, 6.03, 6.54, 6.87, 7.06, 7.23, 7.56, 7.72, 7.80, 8.05, 8.24, 8.68, 9.39, 9.43, 10.07, 10.30, 10.72, 10.80 and 11.00. The spectrum was obtained on a Perkin-Elmer Model 21, doublebeam infrared spectrophotometer, Serial No. 760 (gain 5.0, response 1.0, speed 5.0, suppression 3.0). The infrared absorption spectrum of Phytoactin in chloroform is shown in FIGURE 1 of the accompanying drawings.

In order to eliminate the absorption of the chloroform solvent, the infrared absorption spectrum of Phytoactin was also obtained in a potassium bromide pellet with a 6.24 micron polystyrene reference band added, on a Baird Model 455 I.R. spectrophotometer. This spectrum is shown in FIGURE 3 of the accompanying drawings. There is relatively little change from the determination in chloroform solution.

Referring to FIGURE 3, Phytoactin shows strong absorption bands at the following positions characteristic of the peptide bond, expressed in microns and parenthetically in wave numbers in reciprocal centimeters: 2.77–3.07 (3600–3250), 3.33–3.42 (3000–2925), 5.87–6.24 (1700–1600), and 6.42–6.70 (1560–1490). Other significant absorption bands are shown at 6.0–6.07 (1670–1640), 6.83–6.90 (1470–1450), 7.20–7.35 (1390–1360), 7.57–7.93 (1320–1260), and 9.25–9.43 (1080–1060) (very weak).

Phytoactin optically active; laevo rotatory, $(\alpha)_D^{25}$ —86° (C.=1, methanol). The following electrometric titration data were obtained (titration started from acid range):

| Solvent | pK | Equivalent weight | Remarks |
|---|---|---|---|
| Water | 2.4 | 400 to 500 grams/mole | No free amino gruop. |
| 70% methanol | 3.4 | 3,000 grams/mole | Do. |

Phytoactin exhibits an indefinite melting point, commencing at about 150° C. and melting with apparent decomposition. Melting ranges were determined in a sealed capillary in an oil bath, as follows: 154–162° C., 148–168° C., and 148–171° C.

Elemental analysis of Phytoactin gave the following values:

| C | H | N |
|---|---|---|
| 56.48 | 8.28 | 12.46 |
| 56.71 | 8.28 | 12.24 |
| 57.12 | 8.11 | 12.57 |
| 57.14 | 8.34 | 12.57 |
| [1] 56.86 | [1] 8.25 | [1] 12.46 |

[1] Average.

Amide nitrogen was found to be 0.9%. Sulfur and halogen are absent.

The molecular weight of Phytoactin has been determined to be 46,000 (plus or minus 10%) by the Ehrenberg modification of the Archibald method for the approach to sedimentation equilibrium. Two ultracentrifuge determinations were made, in pH 7.2, 0.01 molar "tris" buffer with 0.05 molar NaCl added as a supporting electrolyte. Phytoactin obtained as described herein satisfied the first criterion for ultracentrifugal homogeneity in "velocity ultracentrifuge" experiments. The material gave only one sedimenting boundary, which remained symmetrical throughout the experiments.

Phytoactin was examined by one-dimensional paper chromatography using Whatman No. 1 paper and the solvent systems indicated below. The developed chromatograms were air dried at room temperature and bioautographed on agar plates seeded with *Glomerella cingulata*.

| System | Rf | Remarks | Running time, hrs. |
|---|---|---|---|
| Water saturated n-butanol | 0.96 | Well defined spot | 16 |
| n-Butanol-acetic acid-water (2-1-1) | 0.94 | do | 16 |
| n-Butanol-pyridine-water (1-0.6-1) | 0.97 | do | 16 |
| 3% aqueous ammonium chloride | 0.02 | do | 4 |
| 50% aqueous acetone | 0.52 / 0.94 | Tailing / Well defined spot | 6 |
| Benzene-acetic acid-water (2-2-1, organic phase) | 0.18 | Tailing | 16 |
| Tert. butanol-acetic acid-water (74-3-25) | 0.89 | Well defined spot | 28 |

The chromatographic data for Phytoactin is consistent with the unusual solubility of this polypeptide compound in such fat-solvents as acetone, methylisobutylketone, and chloroform.

The above physical, chemical and biological data clearly distinguishes Phytoactin from the other antifungal antibacterial antibiotics previously reported in the literature. The data for Phytoactin closely resemble those described in our copending applications for Phytostreptin. However, the two can be easily differentiated as indicated by the data in Table VI.

TABLE VI

*Differentiation of Phytostreptin and Phytoactin*

| | Phytostreptin | Phytoactin |
|---|---|---|
| Water solubility | Completely soluble. | Partly soluble. |
| Elemental analysis | 53.04 C | 56.86 C. |
| | 8.08 H | 8.25 H. |
| | 13.41 N | 12.46 N. |
| Molecular weight (±10%) | 28,600 | 46,000. |
| Percent amide N | 1.5% | 0.9%. |
| Infrared spectrum: | | |
| 7.2–7.35 microns (1,390–1,360). | Shoulder | Weak band. |
| 8.77–9.43 microns (1,140–1,060). | Broad band | Much less absorption with a very weak band at 9.25–9.43 microns (1,080–1,060). |
| Electrometric titration | Apparent free amino group. | No free amino group. |
| Heat stability (30 min. at 65° C.): | | |
| pH 3 | Stable | Stable. |
| pG 7 | do | Do. |
| pH 10 | do | Unstable. |

Phytoactin is produced according to the invention by fermenting a nutrient medium with a Phytoactin-producing organism of the genus Streptomyces, and in particular, the species *S. hygroscopicus*, as exemplified by *S. hygroscopicus* NRRL 2752. It will be understood that it is necessary to select a Phytoactin-producing (polyamidohydrostreptin-producing) strain of the organism, as the ability to produce the antibiotic may vary with the strain. As is well known, such variation between strains of a microorganism is frequently encountered in the microbiological production of various substances.

The antifungal may be routinely determined by the agar plate assay method using *Glomerella cingulata* or *Candida albicans* as the test organism.

In this invention, a nutrient medium is fermented with a Phytoactin-producing culture until substantial antifungal activity is produced. Preferably, an aqueous nutrient medium is fermented under submerged, aerobic and agitated conditions.

Nutrient media which are suitable for the production of the antifungal include a suitable source of assimilable carbon, preferably a carbohydrate source such as glucose, a source of assimilable nitrogen such as soya flour, corn steep liquor, yeast and the like, and mineral salts, which may be present with the other ingredients, such as corn steep liquor. Inoculum of the organism is prepared by growing it on agar slant media such as oatmeal or peptone-yeast extract. These agar slant cultures can then be used to prepare larger amounts of inoculum by seeding shake flasks containing such media as soy flour and corn steep liquor. These flasks are shaken under conditions suitable for the growth of the organism. The shake flask cultures can then be used for the preparation of larger amounts of inoculum, or, alternatively, they may be used to seed the fermentors directly. Aseptic conditions must be maintained during the preparation of the inoculum and during the subsequent fermentation.

In the fermentation, the desired medium is prepared and the pH of the medium adjusted to about 6.3–7.5, preferably 6.7–7.2. Calcium carbonate is included in the preferred medium. The medium so prepared is sterilized by heating at an elevated temperature under pressure, i.e., at about 120° C. The medium is then cooled to a temperature of approximately 24°–36° C., preferably 27°–34° C. The sterile medium is then inoculated under aseptic conditions with the inoculum prepared as described above.

The fermentation then proceeds at a temperature in the foregoing ranges with agitation and aeration using sterile air. The fermentation period may vary with different media and different operating conditions. Air is ordinarily supplied at the rate of about 0.25–1.5 volumes of free air per volume of medium per minute. The fermentation is continued for a period of time sufficient to achieve optimal and preferably maximal production of Phytoactin. A fermentation period of 72–96 hours is ordinarily sufficient.

Phytoactin may readily be recovered by a number of methods or, alternatively, the whole culture or whole broth may be used as such or may be concentrated or dried by suitable means. It is ordinarily preferred to recover Phytoactin by precipitation or by solvent extraction of the whole culture or whole broth. In the precipitation recovery method, the whole culture is usually filtered or centrifuged at a preferred pH range of 7–8, and the filtrate is acidified to a preferred pH range of 3–5 to precipitate Phytoactin. The preferred acid for this precipitation step is hydrochloric acid, although other acids may also be used. Since the culture mycelium contains appreciable quantities of Phytoactin, the whole culture (without filtration) may, alternatively, be adjusted to pH 3–5 for the precipitation step.

The activity may be recovered from the precipitate or sediment by extraction with a suitable organic liquid in which it is soluble, such as methanol, ethanol, isopropanol butanol, acetone or methylisobutyl ketone. The solvent solution may then be evaporated in vacuo, and the resulting residue further extracted with organic solvents. In the preferred method of recovery, the latter residue after evaporation is extracted exhaustively with methylisobutyl ketone, and the solvent solution is concentrated to small volume in vacuo. The Phytoactin may then be precipitated by the addition of 5 volumes of diethyl ether. The Phytoactin remaining in the methylisobutyl ketone-ether mother liquor may be recovered by concentrating the mother liquor to small volume in vacuo and adding 5 volumes of petroleum ether (30°–60° C.) to precipitate the activity. Alternatively, a solvent extract of the whole culture, whole broth or active precipitated sediment may be used as such or after concentration in vacuo, without further purification.

The following example is furnished to assist in providing a complete understanding of the invention. It is to be understood that the invention is not limited thereto nor to the specific ingredients, proportions and procedures set forth therein, which are given only for purposes of illustration.

EXAMPLE

A nutrient medium was prepared from the following materials:

| | Gm. |
|---|---|
| Soya flour | 30 |
| Corn steep liquor | 5 |
| Dextrose | 10 |
| Water to 1000 ml. | |

After adjusting the mixture to pH 6.7–7.2 with sodium hydroxide, 2 grams of calcium carbonate were added. A slant culture of the Phytoactin-producing organism NRRL 2752 was used to inoculate a number of 500 ml. Erlenmeyer flasks, each containing 120 ml. of the above medium (previously sterilized for 30–45 minutes). These flasks were shaken at 28° C. for 48–72 hours until good growth was obtained.

A nutrient medium was prepared from the following materials:

| | Gm. |
|---|---|
| Soya flour | 240 |
| Corn steep liquor | 40 |
| Dextrose | 80 |
| Water to 8000 ml. | |

After adjusting the mixture to pH 6.7–7.2 with sodium hydroxide, 16 grams calcium carbonate were added. The mixture was sterilized with steam, cooled to 28° C. and inoculated with 120 ml. of the inoculum prepared above. The organism was then cultivated at 28° C. under submerged conditions of aeration and agitation for a period of 20–24 hours.

A nutrient medium was prepared from the following materials:

| | Lbs. |
|---|---|
| Soya flour | 23 |
| Corn steep liquor | 3.6 |
| Dextrose | 27.5 |
| Water to 110 gals. | |

After adjusting the mixture to pH 6.7–7.2 with sodium hydroxide, 4.6 pounds of calcium carbonate were added. The mixture was sterilized with steam, cooled to 28° C. and inoculated with 8000 ml. of the inoculum prepared above. The organism was then cultivated at 28° C. under submerged conditions of aeration and agitation for a period of 90 hours.

The fermentation whole culture was adjusted to pH 4 with hydrochloric acid and filtered using diatomaceous earth filter aid (Celite 503). The wet filter cake was then extracted with 50 gallons of methanol, and the alcohol extract containing a large quantity of water was concentrated in vacuo to approximately 10 liters. The concentrate containing mostly water as the solvent was readjusted to pH 4 and the precipitated solid recovered by centrifugation. The recovered active sediment was then slurried with methanol (16 liters), filtered and the alcohol extract concentrated to approximately 500 ml. During the concentration, about 10 liters of methanol was added to eliminate water present. The alcoholic solution was then evaporated to dryness on 332 grams of Celite 503 in vacuo. The filteraid-solid was preliminarily extracted with petroleum ether (30°–60° C.) (2700 ml.) and diethyl ether (2410 ml.), and then exhaustively extracted with methylisobutyl ketone (41,500 ml.). The methylisobutyl ketone solution was concentrated to small volume (900 ml.) and the Phytoactin precipitated by the addition of five volumes of diethyl ether (4500 ml.). The solid thus obtained was washed with further quantities of diethyl ether (2000 ml.) and dried in vacuo (weight 82 grams).

The solid Phytactin (polyamidohygrostreptin product thus obtained has the characteristics described above in the specification, and constituted the product tested in each instance. It is apparently in a high state of purity, as evidenced by the high activity per unit weight, both in vitro and in vivo (plants), and the test for homogeneity.

Further quantities of Phytoactin were obtained by concentrating the methylisobutyl ketone-ether mother liquor to 400 ml. in vacuo and adding 2000 ml. petroleum ether (30°–60° C.). The precipitated solid was filtered, washed with petroleum ether (30°–60° C.) and dried in vacuo (19.6 gm.).

The invention thus provides a new antifungal substance, which is particularly effective against plan pathogens and useful in the control of diseases caused by such organisms. The invention also provides a new process for the production and purification of Phytoactin.

This application is a continuation-in-part of our co-pending patent applications, Serial No. 628,769, filed December 17, 1956, and Serial No. 659,818, filed May 17, 1957.

The invention is hereby claimed as follows:

1. The antifungal substance polyamidohydrostreptin, an antifungal gram-positive antibacterial laevo rotatory polypeptide containing the amino acid groups valine, alphaalanine, proline, lucine, arginine, glycine, and serine; being soluble in methanol, ethanol, n-butanol, chloroform, acetone, methylisobutyl ketone, dioxane, tetrahydrofuran, formamide, ethylene chloride, and 1 N NaOH; being slightly soluble in diethyl ether, 1 N HCl, and water; being insoluble in petroleum ether (30–60° C.), benzene and ethyl acetate; having the elemental analysis 56.86% carbon, 8.25% hydrogen, and 12.46% nitrogen; being essentially inactive against *Escherichia coli* and *Mycobacterium tuberculosis* No. 607 and having specific activity against the remaining organisms listed in Table II and *Phytophthora infestans, Uromyces phaseoli*, and *Puccinia rubigo-vera*; exhibiting no significant ultraviolet absorption maxima in the region 230–410 millimicrons; having the infrared absorption spectrum in potassium bromide pellet shown in FIGURE 3; having electrometric titration pK values, starting from the acid range, (1) in water of 2.4 and an equivalent weight of 400 to 500 grams per mole, and (2) in 70% by weight of methanol in water of 3.4 and an equivalent weight of 3000 grams per mole, and having a molecular weight of 46,000 as determined by the Ehrenberg modification of the Archibald method.

2. The process which comprises fermenting a nutrient medium with a polyamidohydrostreptin-producing strain of *Streptomyces hygroscopicus* until substantial antifungal activity is produced.

3. The process which comprises fermenting a nutrient medium with a polyamidohygrostreptin-producing strain NRRL 2752 of *Streptomyces hygroscopicus* until substantial antifungal activity is produced.

4. The process which comprises fermenting a nutrient medium with a polyamidohygrostreptin-producing strain NRRL 2752 of *Streptomyces hygroscopicus* until substantial antifungal activity is produced, and producing a concentrate of Phytoactin from the fermentation product.

5. The process which comprises fermenting under aerobic conditions an aqueous nutrient medium containing a source of assimilable nitrogen, and a source of assimilable carbon, with a polyamidohygrostreptin-producing strain NRRL 2752 of *Streptomyces hygroscopicus* until substantial antifungal activity is produced.

6. The process which comprises fermenting under aerobic conditions an aqueous nutrient medium containing an organic source of assimilable nitrogen and a carbohydrate, with a polyamidohygrostreptin-producing strain NRRL 2752 of *Streptomyces hygroscopicus* at a temperature of about 24° C. to 36° C. for about 72 to 96 hours.

7. The process which comprises fermenting under aerobic conditions an aqueous nutrient medium containing an organic source of assimilable nitrogen and a carbohydrate, with a polyamidohygrostreptin-producing strain NRRL 2752 of *Streptomyces hygroscopicus* until substantial antifungal activity is produced, adjusting the pH of the fermentation product to about 3 to 5, and separating the solid Phytoactin concentrate from the liquor.

8. The process which comprises fermenting under submerged aerobic conditions an aqueous nutrient medium containing an organic source of assimilable nitrogen and a carbohydrate, with a polyamidohygrostreptin-producing strain NRRL 2752 of *Streptomyces hygroscopicus* at a temperature of about 24° C. to 36° C. and a pH of about 6.3 to 7.5 until substantial antifungal activity is produced, adjusting the pH of the fermentation product to about 3 to 5, separating the solid Phytoacin concentrate from the liquor, extracting the concentrate with an organic solvent for Phytoactin selected from the group consisting of lower alkyl alcohols and lower alkyl ketones, and recovering Phytoactin from the solvent extract.

References Cited in the file of this patent

Ziffer et al.: Phytopathology, 1957, p. 539.